(12) United States Patent
Kapner, III et al.

(10) Patent No.: US 8,799,977 B1
(45) Date of Patent: Aug. 5, 2014

(54) SET-TOP BOX TO REQUEST A HEAD END TO COMMAND ONE OF A PLURALITY OF OTHER SET-TOP BOXES TO TRANSMIT AN AVAILABLE VIDEO PROGRAM

(75) Inventors: L. Jeffrey Kapner, III, Yorba Linda, CA (US); Peter Jay Schwartz, Fullerton, CA (US)

(73) Assignee: Keen Personal Media, Inc., Irvine, CA (US)

( * ) Notice: Subject to any disclaimer, the term of this patent is extended or adjusted under 35 U.S.C. 154(b) by 716 days.

(21) Appl. No.: 12/887,385

(22) Filed: Sep. 21, 2010

Related U.S. Application Data

(63) Continuation of application No. 10/028,395, filed on Dec. 22, 2001, now abandoned.

(51) Int. Cl.
*H04N 7/173* (2011.01)
*G06F 15/167* (2006.01)

(52) U.S. Cl.
USPC .............................. 725/116; 725/87; 709/212

(58) Field of Classification Search
None
See application file for complete search history.

(56) References Cited

U.S. PATENT DOCUMENTS

| | | | |
|---|---|---|---|
| 5,568,181 A | 10/1996 | Greenwood et al. | |
| 5,619,247 A | 4/1997 | Russo | |
| 5,956,716 A | 9/1999 | Kenner et al. | |
| 5,978,381 A | 11/1999 | Perlman et al. | |
| 6,208,804 B1 | 3/2001 | Ottesen et al. | |
| 7,002,942 B2 * | 2/2006 | Kotzin | 370/338 |
| 7,035,907 B1 * | 4/2006 | Decasper et al. | 709/212 |
| 7,047,406 B2 | 5/2006 | Schleicher et al. | |
| 7,689,532 B1 * | 3/2010 | Levy | 713/176 |
| 2002/0162109 A1 | 10/2002 | Shteyn | |
| 2002/0184638 A1 * | 12/2002 | Agnihotri et al. | 725/89 |
| 2003/0028610 A1 * | 2/2003 | Pearson | 709/213 |
| 2003/0133692 A1 * | 7/2003 | Hunter | 386/35 |
| 2005/0028208 A1 | 2/2005 | Ellis et al. | |

* cited by examiner

*Primary Examiner* — Jason K Lin

(57) ABSTRACT

Disclosed is a set-top box connectable to a display device and a video distribution network that includes a head end, the set-top box and a plurality of other set-top boxes that can store video programs. The set-top box includes a terminal controller responsive to user input and a video sharing program. The terminal controller responsive to the video sharing program displays a menu of available video programs identifying video programs stored at the plurality of other set-top boxes. Furthermore, the terminal controller responsive to user input and the video sharing program selects an available video program from the menu in response to user input, and requests the head end to command one of the plurality of other set-top boxes storing the selected available video program to transmit the selected available video program to the set-top box.

21 Claims, 4 Drawing Sheets

MENU OF AVAILABLE VIDEO PROGRAMS 148

| NUMBER/ RANK | TITLE | GENRE | PRICE |
|---|---|---|---|
| 1 | THE SOPRANOS | DRAMA/ MAFIA | $3.00 |
| 2 | THE HISTORY OF ROCK 'N' ROLL | MUSIC | $1.00 |
| 3 | THE WEST WING | DRAMA/ NETWORK SERIES | $1.50 |
| 4 | WHO WANTS TO BE A MILLIONAIRE | GAME SHOW | $1.00 |
| 5 | POINT BREAK | ACTION/ MOVIE | $4.00 |
| ... | ... | ... | |

Price column entries marked 164.

FIG. 3

SET-TOP BOX TO REQUEST A HEAD END TO COMMAND ONE OF A PLURALITY OF OTHER SET-TOP BOXES TO TRANSMIT AN AVAILABLE VIDEO PROGRAM

This application is a Continuation of application Ser. No. 10/028,395, filed Dec. 22, 2001.

BACKGROUND OF THE INVENTION

1. Field of the Invention

The present invention relates to the field of set-top boxes. More particularly, the present invention relates to a set-top box that requests a head end to command one of a plurality of other set-top boxes to transmit an available video program to the set-top box.

2. Description of the Prior Art

Advancements in communications technology and increased consumer sophistication have challenged the distributors of video programming content to provide users of their services with entertainment services more convenient and accessible than those traditionally made available through cable, satellite, and broadcast television. Additionally, video service providers are looking for new tools to secure relationships with their customers and reduce customer attrition, including looking for tools to compensate customers for loyalty.

Conventional systems for receiving and displaying video programming typically include a monitor or a television (TV) set connected to a set-top box. The set-top box is connected through a coaxial cable to a cable TV network for "cable TV" or a satellite dish for "satellite TV." The TV set and the set-top box are usually located in a user's home and receive a multitude of TV channels from a broadcast head end, wherein each TV channel broadcasts a multitude of programs. In order to select and watch a certain program a user typically utilizes a remote control to control at least the set-top box to tune to a desired channel. The TV set receives a video signal from the set-top box and displays the program of the desired channel. Furthermore, present conventional systems now enable a user to subscribe to and receive premium video programming such as subscription channels, pay-per-view services, or video-on-demand services, in order to watch a movie during a certain day and time of day.

Unfortunately, subscription channels only provide a relatively small number of video program offerings (e.g. movies), all of which are aired at pre-scheduled dates and times, and over which the user has no control. Similarly, most pay-per-view systems only permit the user to choose from a relatively small number of video program selections for home viewing, with the selected video programs generally being presented only at pre-scheduled viewing times, again over which the user has no control.

On the other hand, more recent video on demand (VOD) systems allow a user to order a desired video program, from a relatively limited selection of video programs (e.g. up to 200 video titles), for home viewing, instantaneously. VOD systems are very popular with users who enjoy being able to watch video programs, whenever they want, without the hassle of going to a video rental store or waiting for a pre-scheduled viewing time, as with subscription channels and pay-per-view systems. This on demand technology provides convenience for the viewer. Moreover, VOD systems are highly desired by video programming providers (e.g. cable and satellite networks), as they have been shown to increase revenue in the systems in which they are deployed. Unfortunately, VOD systems are extremely capital intensive to deploy at both the video programming distribution center and in the underlying network infrastructure, which has resulted in a significant barrier to mass industry adoption. In addition, the storage costs required to store additional content and titles is prohibitive if the video service provider wants to offer a broad variety of programming.

For example, typical VOD systems for providing VOD to a user usually include a two-way digital set-top box and a network infrastructure to provide direct connections between the video programming distribution center and the set-top box. In order to accomplish this direct connection, a forward digital channel is assigned to the set-top box for the transport of video programs and a back channel is usually needed for the purchase and control of the stream. Thus, typical VOD systems require bi-directional communication throughout the dedicated session. Therefore, a dedicated channel for the VOD session must be created in real-time to each user's set-top box, whenever a user engages the on demand video programming. This requires sophisticated switching at the network level and sophisticated video distribution system functionality. Thus, to implement a typical VOD system, a video programming provider must undergo major network infrastructure changes and major video distribution system upgrades to support VOD, which can represent a significant capital cost to the video programming provider.

There is, therefore, a need to provide techniques for providing convenient access to wide selection of video programming content to users, that can be viewed by the user in a relatively short amount of time, without requiring the major changes to the video distribution system and network infrastructure required to support today's typical VOD systems.

SUMMARY OF THE INVENTION

The present invention may be regarded as a set-top box connectable to a display device and a video distribution network. The video distribution network includes a head end, the set-top box and a plurality of other set-top boxes that can store video programs. The set-top box includes a video distribution network interface to interface the set-top box with the video distribution network, a display interface to display a menu of available video programs on the display device, a user interface to receive user input, a local memory to store a video sharing program, and a terminal controller responsive to user input and the video sharing program.

The terminal controller responsive to the video sharing program displays a menu of available video programs identifying video programs stored at the plurality of other set-top boxes Furthermore, the terminal controller responsive to user input and the video sharing program selects an available video program from the menu of available video programs in response to user input, and requests that the head end command one of the plurality of other set-top boxes storing the selected available video program to transmit the selected available video program to the set-top box.

The present invention may also be regarded as a computer program embodied in a computer readable storage medium for use in the set-top box. The computer program comprises code segments for displaying a menu of available video programs that identifies video programs stored at the plurality of other set-top boxes that are accessible to the set-top box. Furthermore, the computer program comprises code segments for selecting an available video program from the menu of available video programs in response to user input, and requesting the head end to command one of the plurality of other set-top boxes storing the selected available video program to transmit the selected available video program to the set-top box.

The present invention may further be regarded as a method for transmitting an available video program to a set-top box from one of a plurality of other set-top boxes storing the available video program. The head end polls the set-top boxes to identify video programs stored at the set-top boxes. A menu of available video programs stored at the plurality of other set-top boxes is displayed to a user. An available video program is selected from the menu of available video programs displayed at the set-top box. The head end is requested to command one of the plurality of other set-top boxes storing the selected available video program to transmit the selected available video program to the set-top box.

The present invention may also be regarded as a head end connectable to the video distribution network, which includes the head end, the set-top box, and the plurality of other set-top boxes. The head end includes a head end controller and memory to store a video indexing program and a system video program index. The head end controller responsive to the video indexing program polls the set-top boxes to identify video program stored at the set-top boxes and generates the system video program index based upon available video programs stored at the set-top boxes.

BRIEF DESCRIPTION OF THE DRAWINGS

FIG. 3 shows an example of a menu of available video programs, according to one embodiment of the present invention.

DESCRIPTION OF THE PREFERRED EMBODIMENTS

Figure 1:
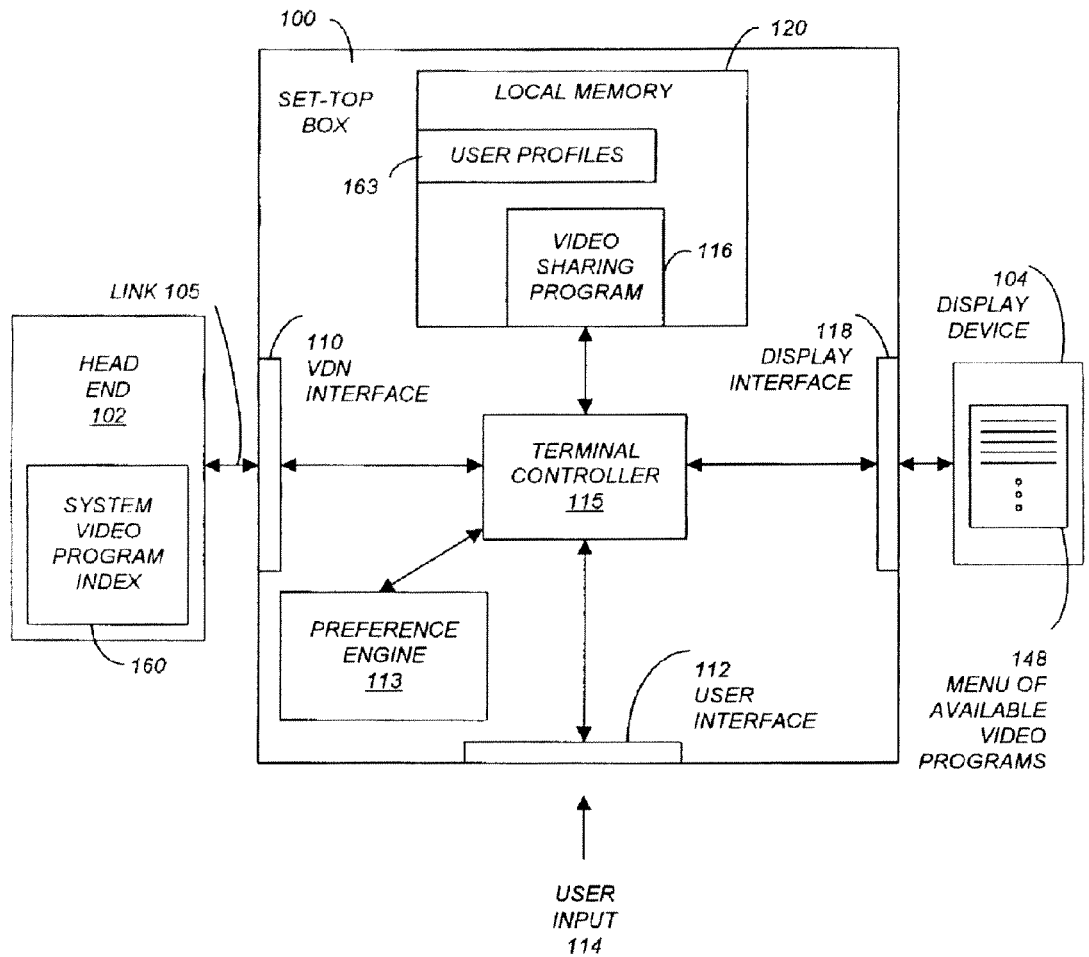
FIG. 1 shows a set-top box connected to a head end and a display device, according to one embodiment of the present invention.

FIG. 1 shows a set-top box 100 connected to a head end 102 and a display device 104, according to one embodiment of the present invention. More particularly, the set-top box 100 is connected to a video distribution network 106 that includes the head end 102, the set-top box 100 itself, and a plurality of other set-top boxes $101_{1-N}$ (e.g. FIG. 2) that can store video programs. The set-top box 100 includes a video distribution network (VDN) interface 110 to interface the set-top box with the video distribution network 106 (including the head end 102 and the plurality of other set-top boxes $101_{1-N}$) through a link 105, a display interface 118 to display a menu of available video programs 148 on the display device 104, a user interface 112 to receive user input 114, a local memory 120 to store a video sharing program 116, and a terminal controller 115 responsive to user input and the video sharing program 116.

The terminal controller 115 responsive to the video sharing program 116 displays on the display device 104 the menu of available video programs 148 identifying video programs stored at the plurality of other set-top boxes $101_{1-N}$ that are accessible to the set-top box 100. Furthermore, the terminal controller 115 responsive to user input 114 received by the user interface 112 and the video sharing program 116 selects an available video program from the menu of available video programs 148 in response to user input 114. Thus, in response to a user selecting an available video program, the terminal controller 115 of the set-top box 100 requests that the head end 102 command one of the plurality of other set-top boxes $101_{1-N}$, storing the selected available video program, to transmit the selected available video program to the set-top box 100. Accordingly, techniques are provided for convenient access to a wide selection of video programming content to users, from other set-top boxes $101_{1-N}$, without requiring the major changes to the video distribution system and network infrastructure required to support today's typical VOD systems.

In one embodiment, the menu of available video programs 148 is generated based upon a system video program index 160 that identifies all of the available video programs stored at all of the set-top boxes (i.e. the system video program index is an index of all of the available video programs stored at the set-top box 100 and at the plurality of other set-top boxes $101_{1-N}$). Typically, the system video program index 160 is created at the head end 102 and transmitted to the set-top box 100.

The head end 102 can be a cable head-end, a satellite head-end, a terrestrial broadcast head-end, a multiple-service operator (MSO), a computer server head-end, or any combination thereof, that is capable of broadcasting the system video program index 160, program guide information, video programs, etc., to the set-top box 100. The display device 104 is typically a television, computer monitor, or any other sort of display device.

The system video program index 160 and the program guide information can be transmitted from the head end 102 to the set-top box 100 across link 105 in any type of data format designed to transfer data such as concatenated data, packetized data, associated database sets of attributes, etc.

The video programs can be transmitted from the head end 102 to the set-top box 100 across link 105 in a digital format (e.g. Moving Pictures Experts Group (MPEG)-2 format, Advanced Television System Committee (ATSC) format, Digital Video Broadcast (DVB) format, Open Cable Standards, etc.) or an analog format (e.g. National Television Standard Committee (NTSC), Phase Alternation Line (PAL), etc.) to the set-top box 100. The video programs typically include audio and video (A/V) information (e.g. a movie, television program, etc.) but can also include other types of information such as data. Alternatively, the video program can be purely data. For example, the data of a digitally broadcasted video program may include graphics, video, web pages, multimedia, text, and other types of data in a variety of differing data formats (e.g. Internet Protocol (IP), Advanced Television Enhancement Forum (ATVEF) content, Open Cable Standards, etc.).

The link 105 can be broadly defined as a communication network formed by one or more transport mediums. The link 105 can include a variety of communication networks such as cable networks, terrestrial broadcast networks, satellite networks, computer networks (e.g. the Internet, wide area networks (WANs), local area networks (LANs), wireless networks, etc.), or generally any sort of public or private communications network, and combinations thereof. Examples of a transport medium include, but are not restricted to electrical wire, optical fiber, cable, or wireless channels using terrestrial, satellite, radio frequency, or any other wireless signaling methodology. In one embodiment, the set-top box 100 is coupled to the head end 102 by a link 105 that provides a persistent connection (e.g. a cable link).

Figure 2:
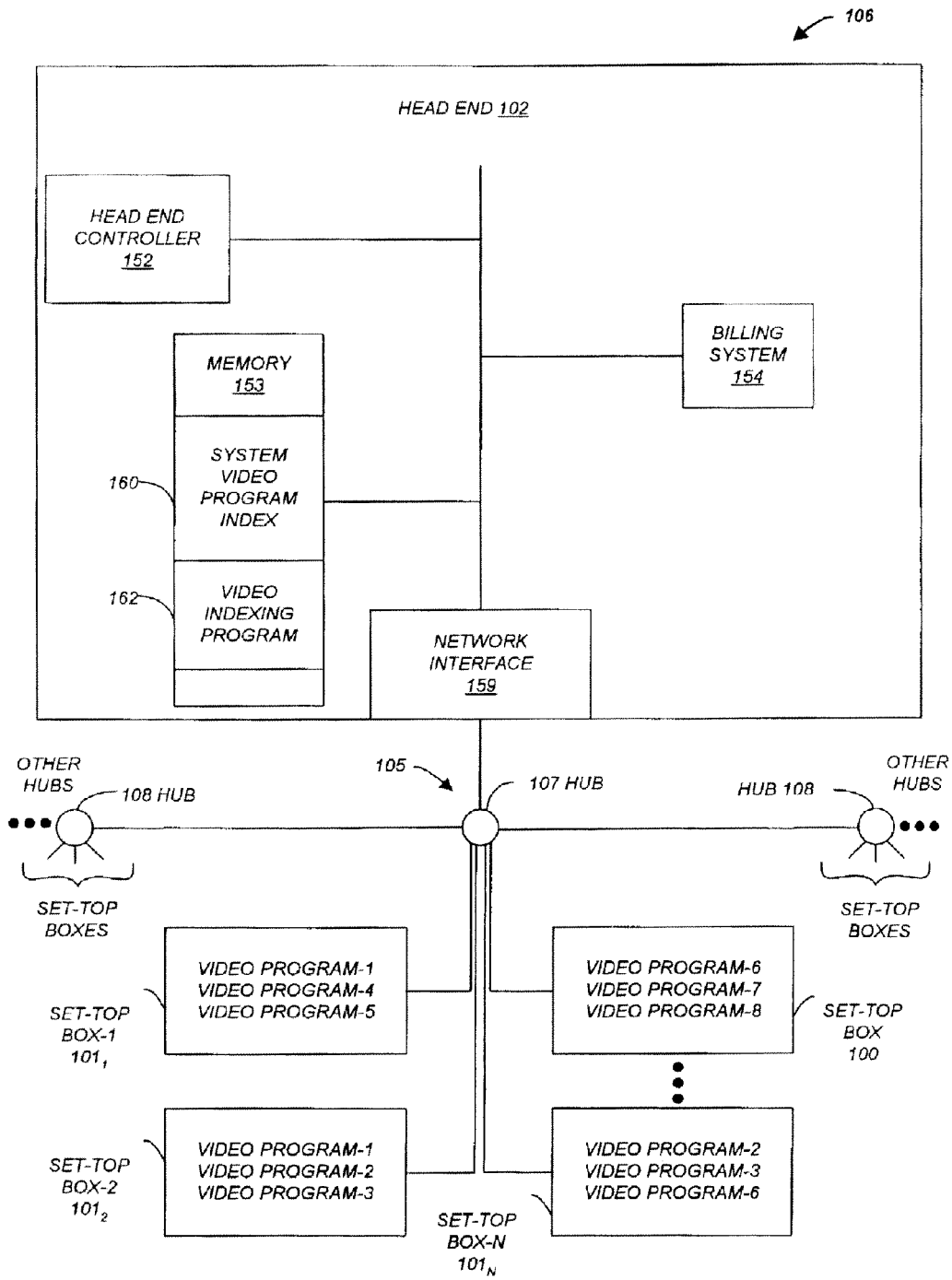
FIG. 2 shows an example of a video distribution network including a set-top box, a plurality of other set-top boxes, and a head end, according to one embodiment of the present invention.

In one embodiment, the link 105 can include a video distribution network 106. In one particular embodiment, the video distribution network 106 is a cable network in which the head end 102 is a cable head-end. Turning briefly to FIG. 2, FIG. 2 shows an example of a cable video distribution network 106 including a set-top box 100, a plurality of other set-top boxes $101_{1-N}$, and a head end 102, all interconnected to one another, according to one embodiment of the present invention. Particularly, in this example, set-top box 100 and the plurality of other set-top boxes $101_{1-N}$ are connected to one another via hub 107. Furthermore, other hubs 108, in turn connected to other set-top boxes, are connected to hub 107 such that a peer-to-peer cable network 106 of set-top boxes is formed. Each of the hubs 107 and 108 may include routers and servers, as is known in the art. Also, as known in the art, nodes having switches are also present in standard cable networks (not shown here for brevity). It should be appreciated that cable networks are well known in the art, and that embodiments of the present invention can utilize conventional cable networks to perform aspects of the present invention.

As shown in the present example, set-top box 100 and the plurality of other set-top boxes $101_{1-N}$ are connected to one another via hub 107. Each set-top box includes a number of stored video programs. For example, set-top box 100 may include video program-6 (e.g. The Matrix), video program-7 (e.g. Gladiator), and video program-8 (e.g. The Fifth Element). Furthermore, continuing with the present example, the plurality of other set-top boxes $101_{1-N}$ can include a number of stored video programs, for example: set-top box-1 $101_1$ includes video program-1 (e.g. The Sopranos), video program-4 (e.g. Who Wants to be a Millionaire), and video program-5 (e.g. Point Break); set-top box-2 $101_2$ includes video program-1 (e.g. The Sopranos), video program-2 (e.g. The History of Rock n' Roll), and video program-3 (e.g. The West Wing); and set-top box-N $101_N$ includes video program-2 (e.g. The History of Rock n' Roll), video program-3 (e.g. The West Wing), and video program-6 (e.g. The Matrix). It should of course be appreciated that these are only examples of video programs stored at a plurality of set-top boxes and any combination of video programs and configurations of set-top boxes is possible. As will be discussed, embodiments of the present invention allow any set-top box within the cable network 106 to select a video program stored at another set-top box and request that the head end 102 command the other set-top box storing the requested available video program to send it to the requesting set-top box.

With reference again to FIG. 1 to continue the description of the exemplary set-top box 100, the exemplary set-top box 100 preferably includes a video distribution network (VDN) interface 110, a user interface 112, a preference engine 113, a display interface 118, a local memory 120, and a terminal controller 115. The video distribution network (VDN) interface 110 receives the system video program index 160, program guide information, and video programs from the head end 102 and other set-top boxes $101_{1-N}$ and transmits them to the terminal controller 115 for processing. The VDN interface 110 can be any sort of suitable interface for this purpose. Particularly, in one embodiment, the VDN interface 110 can be a standard cable network interface. The user interface 112 is used to receive user input 114 and transmits the user input to the terminal controller 115 for processing. As will be discussed in more detail later, user input 114 is utilized for the selection of an available video program from the menu of available video programs 148. The user input 114 can also cause the set-top box 100 to perform other functionality (e.g. changing channels, digitally recording video programs, etc.).

The user input 114 can be from a remote control (e.g. infrared or optical), keyboard, touch screen, voice activation, mouse, telephone, cellular telephone, computer (personal, laptop, network, etc.) that is locally or remotely connected to the set-top box 100, a personal digital assistant (PDA) that is locally or remotely connected to the set-top box 100, or basically any sort of input device that is locally or remotely connected to the set-top box 100 to transmit the selections of the user to the set-top box 100. The user interface 112 may include appropriate hardware and associated software to receive the transmission of user input 114 from a local or remote user input device. For example, the user interface 112 may include: infrared (I/R) receivers, optical receivers, appropriate Input/Output (I/O) cards, network interface cards, internal/external modems (standard telephone modem, Digital Subscriber Line (DSL) modem, cable modem, etc.), plain old telephone system (POTS) receivers, cellular telephone receivers, wireless receivers, etc.; such that the set-top box 100 can be connected locally to a user input device, or, remotely to a user input device through a computer network (e.g. the Internet), the POTS, a cellular network, or a wireless network, etc. It should be appreciated by those skilled in the art that any sort of user input device through any type of connection and network can be used to transmit the selections of the user to the set-top box 100 and the above examples are only illustrative. Thus, the set-top box 100 is capable of being locally or remotely accessed to cause the set-top box 100 to perform functionality such as scheduling video programs to be digitally recorded at a certain time, etc., as well as aspects of the present invention for selecting available video programs from other set-top boxes for viewing and recording.

In some embodiments, the set-top box 100 includes a preference engine 113 coupled to the terminal controller 115. The preference engine 113 is configured to track user selection of video program content (e.g. the channels selected and the types of content on the channels selected) and to create a user profile representing the user's viewing preferences. For instance, the viewing preferences and the selection and ordering of available video programs from other set-top boxes in the menu of available video programs 148 may be categorized based on broadcast content and the associated programming attributes associated with the video program, such as the genre, e.g. sports, action, comedy, drama, entertainment, news, and movies, as well as, associated attributes assigned by the program guide. Additional attributes include titles of programs, actors (principal, secondary, tertiary, etc.), directors, writers, etc. (e.g. that may be included in the program guide information associated with the video program). Moreover, the user's viewing preferences and the selection and ordering of available video programs from other set-top boxes in the menu may be based on additional sources such as preferred TV channels including one or more non-subscribed channels, one or more pay-per-view channels, one or more video-on-demand channels, or a combination thereof. In addition, the viewing preferences may include other categories such as advertising, infomercials, catalogs, Internet content, which is accessible, for example, via a modem.

More particularly, in one embodiment, the preference engine 113 is a software module that learns a user's viewing preferences by monitoring the user's viewing patterns or by specific explicit direction of the user. The preference engine 113 uses the viewing patterns of the user to create a user profile 163 that may be stored in local memory 120. It is contemplated that the preference engine 113 may create user profiles for more than one user and store the multiple user profiles 163 in local memory 120, as well. Thus, the user-specific user profile 163 represents the contents and channels the user prefers and on which day and at what time of day the user watches specific content. The set-top box 100 may continually update individual user profiles 163 depending upon each user's actual viewing preferences and based upon other events, for example, depending on whether or not it is the season for a certain sports event. The preference engine 113, therefore, enables the set-top box 100 to have a "learning" capability for adjusting to each user's viewing preferences.

In some embodiments, as will be discussed, the terminal controller 115 responsive to the video sharing program can apply the user profile 163 to the menu of available video programs 148 to select, order, and rank the video programs in the menu in accordance with the user profile 163.

The display interface 118 preferably displays the menu of available video programs 148 on the display device 104. Also, the display interface 118 displays video programs transmitted from the head end 102 and the plurality of other set-top boxes $101_{1-N}$, as well as program guide information, on the display device 104. The menu of available video programs 148 is suitably generated by the terminal controller 115 based upon the system video program index 160 received from the head end 102 and, after processing, is then displayed via the display interface 118 on the display device 104. Alternatively, the head end 102 can generate the menu of available video programs 148 and transmit the menu of available video programs 148 to the set-top box 100 such that the menu of available video programming is then displayed via the display interface 118 on the display device 104.

The local memory 120 is coupled to the terminal controller 115. In one embodiment, the local memory 120 is used to preferably store a video sharing program 116 and the user profiles 163. Furthermore, the local memory 120 stores video programs, such as downloaded video programs from other set-top boxes $101_{1-N}$. Also, the local memory 120 can be used to store the program guide information, the program guide, and other types of information. In one embodiment, the local memory 120 includes a rotating storage disk (e.g. magnetic, optical, etc.). Alternatively, the local memory 120 can include any type of semiconductor memory.

The terminal controller 115 is responsive to the video sharing program 116 to perform many of the functions of the set-top box 100, as will be discussed. As should be appreciated by those skilled in the art, the terminal controller 115 preferably includes a suitable processor and associated memory. Furthermore, the terminal controller 115 may include encoding and decoding functionality (hardware and/or software) to encode analog signals (e.g. NTSC signals) into digital signals (e.g. MPEG-2) and to decode digital signals (e.g. MPEG-2) into analog signals (e.g. NTSC signals). This allows digital signals to be decoded for display on an analog display device and allows analog signals to be encoded into digital signals for recording in local memory along with other functionality associated with set-top boxes. It should be appreciated that set-top boxes are well known in the art. Moreover, it should be appreciated that a set-top box 100 is not the only type of computing device required to be used to implement embodiments of the present invention, but personal computers, home servers, client terminals, or basically any sort of computing device with sufficient processing power and memory can be used.

In one embodiment, the video sharing program 116 is suitably implemented by the terminal controller 115 of the set-top box 100 as one or more instructions or code segments (e.g. as software or a computer program). The instructions/code segments when read and executed by the terminal controller 115 cause the terminal controller 115 to perform the operations necessary to implement the various functions of the embodiments of the invention. Generally, the instructions/code segments are tangibly embodied in and/or readable from a machine-readable medium, device, or carrier, such as memory, data storage devices, and/or a remote device contained within or coupled to the set-top box 100. The instructions/code segments may be loaded from memory (e.g. local memory 120), data storage devices, and/or remote devices into the terminal controller 115 for use during operations.

A user, via user input 114, can select an available video program from the menu of available video programs 148 displayed on the display device 104. The terminal controller 115 responsive to the user input 114 and the video sharing program 116 selects the desired available video program from the menu of available video programs 148. The terminal controller 115 responsive to the video sharing program 116 requests that the head end 102 command one of the plurality of other set-top boxes $101_{1-N}$, storing the selected available video program, to transmit the selected available video program to the set-top box 100.

Referring also to FIG. 2, FIG. 2 shows an example of the video distribution network 106 including set-top boxes (e.g. the set-top box 100 and the plurality of other set-top boxes $101_{1-N}$) interconnected to one another via a hub 107 and to the head end 102, according to one embodiment of the present invention. The head end 102 includes a head end controller 152, a memory 153, a billing system 154, and a network interface 159. Under the control of the head end controller 152, the head end 102 transmits video programs and program guide information via link 105 to the set-top boxes, as well as, commanding one of the other set-top boxes $101_{1-N}$ to transmit a selected available video program to a set-top box 100 that has requested the video program. Furthermore, the head end controller 152 interacts with the billing system 154. The billing system 154 sets the prices of video programs and manages the billing of users. The billing system 154 can also be located, or co-located, at other remote locations, such as at a back office. The network interface 159 enables these communications. The network interface 159 is generally any type of suitable interface for communication between the head end 102 and the cable video distribution network 106 and the set-top boxes via link 105.

The memory 153 stores a system video program index 160 and a video indexing program 162. The head end controller 152 responsive to the video indexing program 162 polls the set-top boxes 100 and $101_{1-N}$ (as well as all the other set-top boxes in the computer network 106) at pre-determined times to identify the video programs stored at each of the set-top boxes. Each set-top box usually returns some sort of data (e.g. a token) indicating the video programs they have stored in their respective local memories (e.g. on their disk drives). The head end controller 152 generates the system video program index 160 based upon the video programs stored at each of the set-top boxes 100 and $101_{1-N}$ and stores the system video program index 160 in memory 153. For example, the system video program index 160 can be an index of each video program stored within the cable network 106 and at which set-top boxes each video program is stored. The memory 153 can include rotating storage disk type memory (e.g. magnetic, optical, etc.), data storage devices, any type of semiconductor memory (RAM, ROM, etc), or any type of suitable memory for storing this type of data.

The head end controller 152 causes the system video program index 160 to be transmitted to the set-top box 100, which uses the system video program index 160 to create the menu of available video programs 148. Further, in response to a user selecting an available video program from the menu of available video programs 148, the head end controller 152 commands one of the other set-top boxes $101_{1-N}$ to transmit the selected available video program to the requesting set-top box 100. The selected available video program can be transmitted from the other set-top box $101_{1-N}$ to the set-top box 100 that receives the available video program through a least cost path. The head end controller 152 can determine this least cost path alone, based on a static layout of the cable network 106, or dynamically in conjunction with present network conditions of the cable network 106, based upon network conditions received from the hubs and routers 107 and 108. Moreover, in some embodiments, the head end 102 can find set-top boxes 100 and $101_{1-N}$ in the cable network 106 that have the same transmit and receive speeds for file sharing and clump those set-top boxes together to improve performance and efficiency.

The least cost path analysis typically takes into account the distance between the transmitting and receiving set-top boxes $101_{1-N}$ and 100 (e.g. to determine a shortest path), the number of hubs/routers 107 and 108 therebetween, as well as the transmission speeds of the transmitting and receiving set-top boxes and links therebetween. Thus, the least cost path analysis usually determines the shortest path first, while taking to into account transmission speeds, to determine the optimal path (e.g. the shortest transmission time for the video program from the transmitting set-top box $101_{1-N}$ to the receiving set-top box 100). It should be appreciated that least cost path analyses and shortest path first analyses are well known in the art.

The data traffic—e.g. the video programs and other associated data—can be communicated between the transmitting and receiving set-top boxes $101_{1-N}$ and 100 through the cable network 106 in any type analog or digital format, and in any type of protocol—e.g. cable system defined protocols, Frame Transfer Protocol (FTP), Transmission Control Protocol/Internet Protocol (TCP/IP), Asynchronous Transfer Mode (ATM), Frame Relay (FR), Point-to-Point Protocol (PPP), wireless protocols, or any other sort of data protocol (as well as OE over Ethernet). In a typical cable network environment, where a video program (e.g. a movie) that is 4.5-6 GB is transmitted along a 6 MHz cable channel, a typical movie will take approximately 15-20 minutes to download. However, in other embodiments, the download time can be decreased. For example, receiving set-top boxes could utilize multiple tuners to receive different segments of a video program from different transmitting set-top boxes, simultaneously, such that the download time can be significantly decreased. In another example, the VDN interfaces 110 of the set-top boxes instead of using standard cable network interfaces could utilize high-speed cable network interfaces (e.g. a high-speed DOCSIS modem) such that video programs downloaded from transmitting set-top boxes can be viewed at the receiving set-top box in real-time. Also, in other embodiments, caching servers located at the hubs 107 and 108 can store the most popular video programs downloaded from set-top boxes (or any type of video programs) such that set-top boxes can download video programs from a relatively close caching server, as opposed to a more distant set-top box, thereby significantly increasing the quickness of downloading a video program.

FIG. 3 shows an example of a menu of available video programs 148, according to one embodiment of the present invention. As previously discussed, the menu of available video programs 148 is generated based upon the system video program index 160. The system video program index 160 identifies all of the video programs stored at all of the set-top boxes 100 and $101_{1-N}$ in the network and at which set-top boxes they are stored. Typically, the system video program index 160 is created at the head end 102 and is transmitted to the set-top box 100. The menu of available video programs 148 is a subset of the system video program index 160 typically including data related to the title, genre, and price of each video program.

The example of a menu of available video programs 148, shown in FIG. 3, illustrates a number of different available video programs 164. It should be appreciated that this is only an example. For example, the illustrated exemplary menu of available video programs 148 includes: number/rank 1 video program-1 (e.g. The Sopranos), genre drama/mafia, price $3.00; number/rank 2 video program-2 (e.g. The History of Rock n' Roll), genre music, price $1.00; number/rank 3 video program-3 (e.g. The West Wing), genre drama/network series, price $1.50; number/rank 4 video program-4 (e.g. Who Wants to be a Millionaire), genre game show, price $1.00; and number/rank 5 video program-5 (e.g. e.g. Point Break), genre action/movie, price $4.00. As shown, the menu of available video programs 148 can include any type of video program from a multitude of different sources. This includes video programs from premium channels, satellite channels, network channels, etc. Furthermore, the menu of available video programs 148 can include the genre of the video program and associated price (e.g. set by the billing system 154). The title, the genre, and the price of the video program can be obtained from the program guide data sent from the head end 102. Moreover, it should be appreciated that if the set-top box 100 already stores an available video program in local memory (e.g. it has been previously purchased) it can be absent from the menu or displayed in the menu without a price or with a designator such as "already purchased".

The available video programs 164 of the menu of available video programs 148 can be selected, numbered, or ranked in a multitude of different ways. For example, the available video programs can be selected, numbered, or ranked: based upon alphabetical order, based on genre, based on price, based on the popularity of the video program in the cable network 106, etc. Furthermore, the terminal controller 115 responsive to the video sharing program 116, when requested by the user, can apply the user's profile 163 to the menu of available video programs 148 using the preference engine 113 to select and/or rank the video programs in accordance with the user's profile 163. The menu of available video programs 148 can also be searched for specific programs that the user would like to watch. Moreover, based on the user profile 163, the set-top box 100 using the preference engine 113 can automatically record to local memory 120 video programs that the user is likely to want to watch.

A brief example will now be given (with reference also to FIGS. 1 and 2). If a user via user input 114 at set-top box 100 selects available video program-1 (e.g. number/rank 1), title- "The Sopranos", from the menu of available video programs 148, the terminal controller 115 responsive to the video sharing program 116 will request that the head end 102 command set-top box-2 $101_2$ storing available video program-1 (e.g. determined by the head end 102 to be the least cost path to set-top box 100) to transmit video program-1 to set-top box 100. Thus, set-top box-2 $101_2$ will transmit video program-1 through hub 107 and along link 105 through the cable network 106 to set-top box 100. Accordingly, techniques are provided for convenient access to a wide selection of video programming content to users, from other set-top boxes, without requiring major changes to the video distribution system and network infrastructure.

Also, in some embodiments, a billing system 154 of the head end 102 can be used to set fees for the video programs and to manage the billing of the users. After a set-top box 100 receives the selected available video program from the other set-top box $101_{1-N}$, the billing system 154 will then bill the user of the set-top box 100 (e.g. the subscriber associated with the set-top box 100) for the received video program. Moreover, the billing system 154 can utilize different schemes to distribute the fee received by the user for the selected video program.

In one example, the whole fee for the selected video program goes to the head end 102 (with some percentage of the fee being sent to the owner of the rights to the video program (e.g. a studio or network)). In another example, X % of the fee goes to the head end 102 (and the owner of the rights to the video program) and Y % is paid as a credit to the set-top box that transmitted the selected video program (e.g. their subscription fee could be reduced by the credit). Alternatively, the Y % percent credit could be accrued in a special video program sharing account for the transmitting set-top box user such that, after a given number of accruals, the transmitting set-top box user will have enough credit to purchase an available video program from another sharing set-top box user in the peer-to-peer sharing cable network 106. Moreover, a wide variety of other percentage allocations are possible. For example, a percentage allocation could also be given to a company that provides and maintains the hardware and software to enable the peer-to-peer video program sharing among the set-top boxes in the cable network.

Continuing with the previous example, if a user via user input 114 at set-top box 100 selects available video program-1 (e.g. number/rank 1), title—"The Sopranos", from the menu of available video programs 148, and the head end 102 commands set-top box-2 $101_2$ storing available video program-1 (e.g. determined to be the least cost path to set-top box 100) to transmit video program-1 to set-top box 100, then the billing system 154 will divide up the $3.00 fee for video program-1 charged to the user of set-top box 100 among the various participants. For example, the operator of the head end 102 may receive $1.00, the owner of the content rights to video program-1 may receive $0.50, the user of set-top box-2 $101_2$ may receive a credit of $0.50, and the remainder of the fee may be distributed to other sources (e.g. the company that provides and maintains the hardware and software to enable the peer-to-peer video program sharing among the set-top boxes in the cable network).

Also, video programs may be designated as "available" or "not available" by either the set-top box storing the video program or by the head end. If a user of the set-top box does not wish to participate in the sharing of his or video programs with other set-top boxes (and gain the benefit of reduced subscription fees or accruals of free shared video programs, as previously discussed) the user can simply designate which video programs they do not wish to share (designating them as "not available") or make a general designation that they do not wish to share any of their video programs, hence making all their video programs "not available". This can be accomplished using standard user interfaces.

Furthermore, the head end 102 can also designate whether video programs are "available" or "not available". Generally, video programs are designated as "available". However, sometimes, a content rights holder to a video program (e.g. a movie studio, TV network, etc.) may not wish to participate in the billing system, previously discussed, and share their video program (even though it would bring them revenue). Accordingly, in order to respect the rights of the content rights holder, the head end 102 will designate these video programs as "not available" and will not permit them to be shared among set-top boxes.

Figure 4:
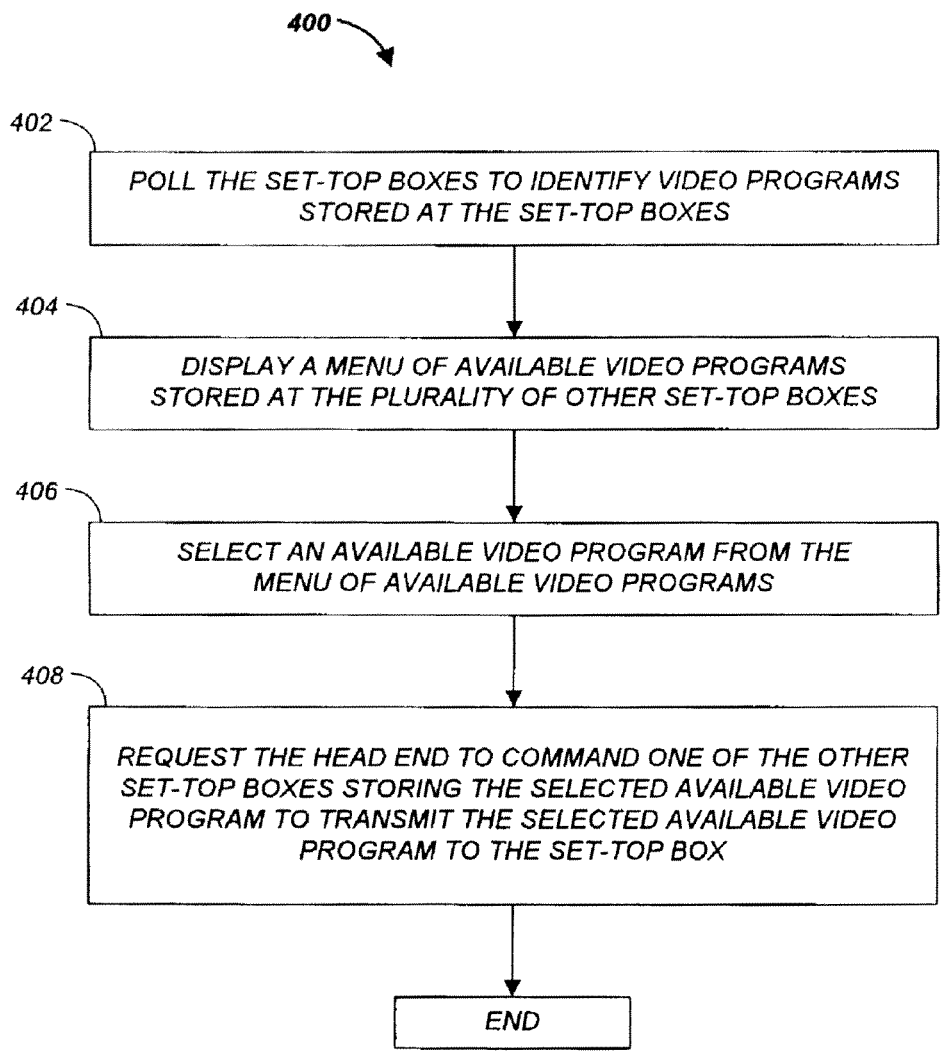
FIG. 4 is a flow diagram according to one embodiment of the present invention.

FIG. 4 is a flow diagram according to one embodiment of the present invention. Particularly, FIG. 4 illustrates a flow diagram 400 for transmitting an available video program to a set-top box 100 from another set-top box $101_{1-N}$ storing the available video program. At step 402, utilizing the head end 102 all of the set-top boxes 100 and $101_{1-N}$ are polled to identify the video programs stored at the set-top boxes. At step 404, the terminal controller 115 responsive to the video sharing program 116 causes the display interface 118 to display a menu of available video programs 148 stored at the plurality of other set-top boxes $101_{1-N}$ on the display device 104. Additionally, as previously discussed, the menu may also include the video programs already stored at the set-top box 100. Next, at step 406, the user is allowed to select an available video program 164 from the menu of available video programs 148. Then, at step 408, in response to user selecting an available video program, the terminal controller 115 responsive to the video sharing program 116 requests that the head end 102 command one of the other set-top boxes $101_{1-N}$ storing the selected available video program to transmit the selected available video program to the set-top box 100.

The embodiments of the present invention and their various functional components can be implemented in hardware, software, firmware, middleware or a combination thereof and utilized in systems, subsystems, components, or sub-components thereof. When implemented in software or computer programs, the elements of the present invention are the instructions or code segments to perform the necessary tasks. The instructions or code segments can be stored in a machine readable medium (e.g. a processor readable medium or a computer readable storage medium), or transmitted by a computer data signal embodied in a carrier wave, or a signal modulated by a carrier, over a transmission medium or communication link. The machine-readable medium may include any medium that can store or transfer information in a form readable and executable by a machine (e.g. a terminal controller, a processor, a computer, etc.). Examples of the machine/processor-readable medium include an electronic circuit, a semiconductor memory device, a ROM, a flash memory, an erasable programmable ROM (EPROM), a floppy diskette, CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may also be downloaded via computer networks such as the Internet, Intranet, etc.

We claim:

1. A set-top box connectable to a display device and a broadcast video distribution network comprising a head-end, the set-top box, and a plurality of other set-top boxes that can store video programs, the set-top box comprising:
    a video distribution network interface to interface the set-top box with the broadcast video distribution network;
    a display interface to display a menu of available video programs on the display device;
    a user interface to receive user input;
    a local memory to store a video sharing program; and
    a terminal controller responsive to user input and the video sharing program for:
        a. displaying a menu of available video programs that is generated based upon a system video program index received from the head end that identifies previously broadcast video programs from the head end that were previously selected and completely stored in local memory by other users based upon user input at the plurality of other set-top boxes, respectively, in the broadcast video distribution network, wherein the system video program index is created by the head end polling the set-top boxes of the video distribution network to identify video programs selected and stored at the set-top boxes by users and based upon whether video programs are designated as available or not available for sharing by at least one of a set top box or by the head end;

b. selecting an available video program from the menu of available video programs in response to user input;

c. requesting the head end to command one of the plurality of other set-top boxes storing the selected complete video program to transmit the selected complete video program to the set-top box; and d. wherein the user associated with the set-top box that receives the selected video program is charged by a billing system to compensate an owner of the head end and a content rights holder of the selected video program and the set-top box that transmitted the selected video program receives a credit from the billing system.

2. The set-top box of claim 1, further comprising a preference engine.

3. The set-top box of claim 2, wherein, the preference engine creates a user profile based upon a user's viewing patterns.

4. The set-top box of claim 3, wherein, the terminal controller responsive to the video sharing program applies the user profile to the menu of available video programs to select the video programs in accordance with the user profile.

5. The set-top box of claim 1, wherein, the selected video program is transmitted from the other set-top box storing the complete video program to the set-top box requesting the video program through a least cost path.

6. The set-top box of claim 1, wherein, the set-top box is coupled to the head end by a link that provides a persistent connection.

7. The set-top box of claim 1, wherein, the head end is a cable head end.

8. A computer program embodied in a non-transitory computer readable storage medium for use in a set-top box connectable to a display device and a broadcast video distribution network comprising a head end, the set-top box, and a plurality of other set-top boxes that can store video programs, the computer program comprising code segments for:

a. displaying a menu of available video programs that is generated based upon a system video program index received from the head end that identifies previously broadcast video programs from the head end that were previously selected and completely stored in local memory by other users based upon user input at the plurality of other set-top boxes, respectively, in the broadcast video distribution network, wherein the system video program index is created by the head end polling the set-top boxes of the video distribution network to identify video programs selected and stored at the set-top boxes by users and based upon whether video programs are designated as available or not available for sharing by at least one of a set top box or by the head end;

b. selecting an available video program from the menu of available video programs in response to user input;

c. requesting the head end to command one of the plurality of other set-top boxes storing the selected complete video program to transmit the selected complete video program to the set-top box; and d. charging the user associated with the set-top box that receives the selected video program by a billing system to compensate an owner of the head end and a content rights holder of the selected video program and crediting the user associated with the set-top box that transmitted the selected video program.

9. The computer program of claim 8, further comprising code segments for a preference engine.

10. The computer program of claim 9, wherein, the preference engine creates a user profile based upon a user's viewing patterns.

11. The computer program of claim 10, further comprising code segments for:

a. applying the user profile to the menu of available video programs;

b. selecting the video programs of the menu of available video programs in accordance with the user profile; and c. displaying the selected video programs of the menu of available video programs.

12. The computer program of claim 8, wherein, the selected video program is transmitted from the other set-top box storing the complete video program to the set-top box requesting the video program through a least cost path.

13. The computer program of claim 8, wherein, the set-top box is coupled to the head end by a link that provides a persistent connection.

14. The computer program of claim 8, wherein, the head end is a cable head end.

15. A method for distributing video programs between set-top boxes in a broadcast video distribution network including a set-top box that can store a video program and is connectable to a display device and in which the broadcast video distribution network comprises a head end, the set-top box, and a plurality of other set-top boxes that can store video programs, the method comprising the steps of:

a. displaying a menu of available video programs that is generated based upon a system video program index received from the head end that identifies previously broadcast video programs from the head end that were previously selected and completely stored in local memory by other users based upon user input at the plurality of other set-top boxes, respectively, in the broadcast video distribution network, wherein the system video program index is created by the head end polling the set-top boxes of the video distribution network to identify video programs selected and stored at the set-top boxes by users and based upon whether video programs are designated as available or not available for sharing by at least one of a set top box or by the head end;

b. selecting an available video program from the menu of available video programs in response to user input;

c. requesting the head end to command one of the plurality of other set-top boxes storing the selected complete video program to transmit the selected complete video program to the set-top box; and d. charging the user associated with the set-top box that receives the selected video program by a billing system to compensate an owner of the head end and a content rights holder of the selected video program and crediting the user associated with the set-top box that transmitted the selected video program.

16. The method of claim 15, further comprising code segments for a preference engine.

17. The method of claim 16, wherein, the preference engine creates a user profile based upon a user's viewing patterns.

18. The method of claim 17, further comprising code segments for:

a. applying the user profile to the menu of available video programs;

b. selecting the video programs of the menu of available video programs in accordance with the user profile; and c. displaying the selected video programs of the menu of available video programs.

19. The method of claim 15, wherein, the selected video program is transmitted from the other set-top box storing the complete video program to the set-top box requesting the video program through a least cost path.

20. The method of claim 15, wherein, the set-top box is coupled to the head end by a link that provides a persistent connection.

21. The method of claim 15, wherein, the head end is a cable head end.

* * * * *